May 15, 1928.  R. C. PIERCE  1,670,044

TIRE BEAD CONSTRUCTION

Filed Jan. 27, 1922

Inventor
R. C. Pierce.
By
Atty.

Patented May 15, 1928.

1,670,044

UNITED STATES PATENT OFFICE.

ROBERT C. PIERCE, OF AKRON, OHIO, ASSIGNOR, BY MESNE ASSIGNMENTS, TO AMERICAN CHAIN COMPANY, INC., A CORPORATION OF NEW YORK.

TIRE-BEAD CONSTRUCTION.

Application filed January 27, 1922. Serial No. 532,097.

This invention relates to pneumatic tires, and particularly to tire casings of the type having inextensible beads or the type known in the art as straight-side tires. This inextensibility is imparted to the tire beads by means of reinforcements located in the lower edges of the beads, these reinforcements being usually formed from wires or bands of metal embedded in the tire. Of the metallic reinforcements in general use there are two distinct types, an endless cable and a braided tape, this invention having to do particularly with the tape or ribbon form of metallic reinforce.

The usual type of wire ribbon in use is composed of a plurality of fine wires braided in a flat tape by passing each wire back and forth over the entire width of the tape and interlacing the wires during the operation. The manufacture of this form of tape requires expensive and complicated machinery, which requires constant attention and is frequently broken down, the wires are twisted and under tension during the braiding operation, and as a result frequently break off requiring stoppage of the braiding operation. The operation of the machinery is slow and expensive.

In addition to the difficulties of manufacture, the finished wire tape is not altogether satisfactory, as it possesses a certain amount of stretchability, owing to the long undulations of the wire, which not only causes it to give slightly under tension, but causes the meshes to close up and force any surrounding rubber out of the wire tape.

In order to simplify the manufacture of wire tape for use in the manufacture of tires and to improve upon the quality of the tape obviating the difficulties referred to in connection with former types of beads, I have designed a wire ribbon such as shown and described, it being apparent that changes and modifications may be made without departing from the invention or sacrificing any of its benefits.

Figure 1:
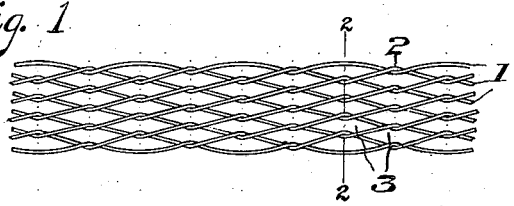
Fig. 1 is a view showing a fragment of a bead tape embodying the invention.
Figure 2:
Fig. 2 is a section on the line 2—2 of Fig. 1.
Figure 3:
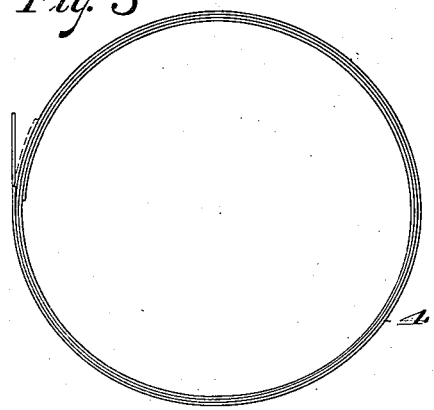
Fig. 3 is a view of a hoop or ring of the tape forming the foundation of the bead.
Figure 4:
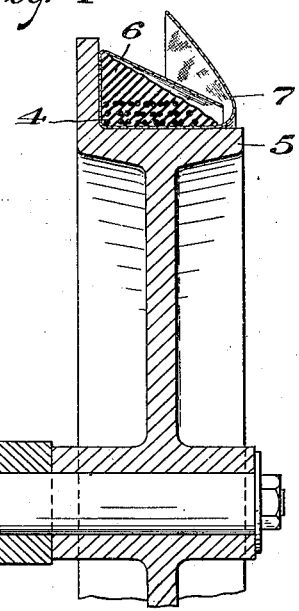
Fig. 4 is a form on which the bead is constructed showing the bead about completed.
Figure 5:
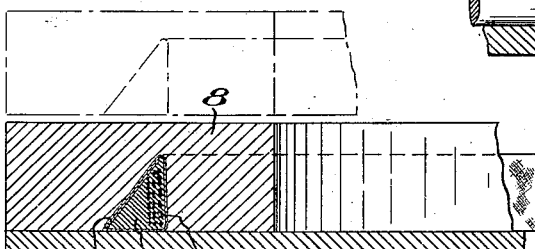
Fig. 5 is a view of the mold in which a bead is placed for vulcanization.

In the drawings the wire tape is shown in detail in Figs. 1 and 2 in which the wire is a substantially flat ribbon composed of a plurality of longitudinal wires or strands 1, which extend the entire length of the bead. Instead of being passed in diagonal lines across the entire width of the bead, the wires are woven back and forth in short undulations which extend over a fractional part of the total width of the tape, and in the form shown extend over the space between two adjacent wires only, each wire being looped around its adjacent wire as at 2, forming elongated diamond-shaped openings or interstices 3.

This is the wire tape or ribbon forming the subject-matter of this invention and it will be seen that it posesses many advantages over the old form of braided wire. It is much easier to manufacture and can be made on simple inexpensive machines, which do not require constant superintendence or frequent repairs. As the undulations of the wire are short the wire tape possesses little or no extensibility and is better suited for the purposes than the old form of wire tape. Furthermore the wire does not have a tendency to curl up or turn over under tension.

Figure 6:
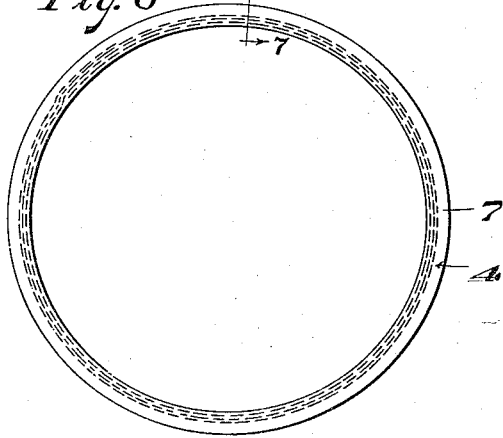
Fig. 6 is a side elevation of a completed bead.
Figure 7:
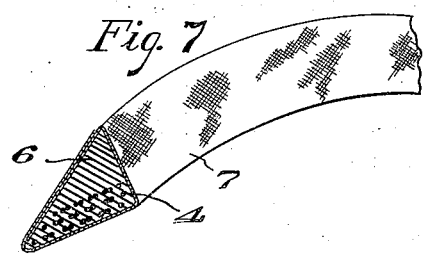
Fig. 7 is a perspective view of a bead broken on the line 7—7 of Fig. 6.

In manufacturing a tire bead the wire may be coated with a rubber compound, or insulated, and is then wrapped in the desired number of convolutions to form the ring or circle of wire 4, the ends being secured in any suitable manner, as by tying or by a touch of solder. The ring 4 may be wound upon a drum or form 5 and over the wire is placed a mass of rubber composition 6 and a fabric covering 7 which is wrapped about the bead. The wire reinforce, the rubber composition, and the covering fabric constitute the complete bead and are placed in a mold 8 in which they are given a partial cure so as to form a complete bead as shown in Fig. 6, ready for incorporation in the tire structure.

The description which has been given is sufficient to enable one skilled in the art to practise the invention and it will be understood that the invention is not necessarily limited to the exact form shown, but may be embodied in other forms within the scope of the claims appended hereto.

Claims:

1. A tire-bead construction provided with a relatively inextensible metallic reinforcement, said reinforcement comprising a plurality of longitudinal wires, each wire except the marginal ones being interlaced with two adjacent wires only.

2. A tire-bead construction provided with a relatively inextensible metallic reinforcement, said reinforcement comprising a plurality of wires extending longitudinally of the reinforcement, each inner wire being formed in repeated undulations which overlap with undulations of the two adjacent wires.

3. A tire bead comprising a wire reinforce to impart inextensibility thereto, said bead containing a plurality of longitudinal wires formed in a mesh, each wire having a plurality of short undulations extending over a portion only of the entire width of the tape and looped about certain of the other wires constituting the tape.

ROBERT C. PIERCE.